Sept. 23, 1969          T. W. KENYON          3,468,163
SPEEDOMETER FOR BOATS AND OTHER VEHICLES
Filed March 29, 1968          3 Sheets-Sheet 1
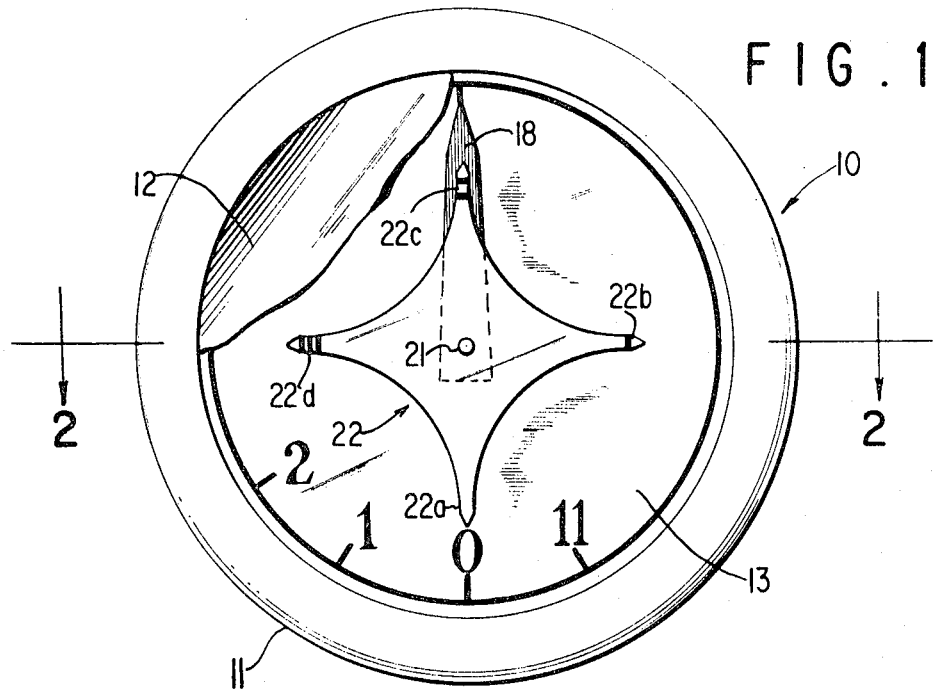
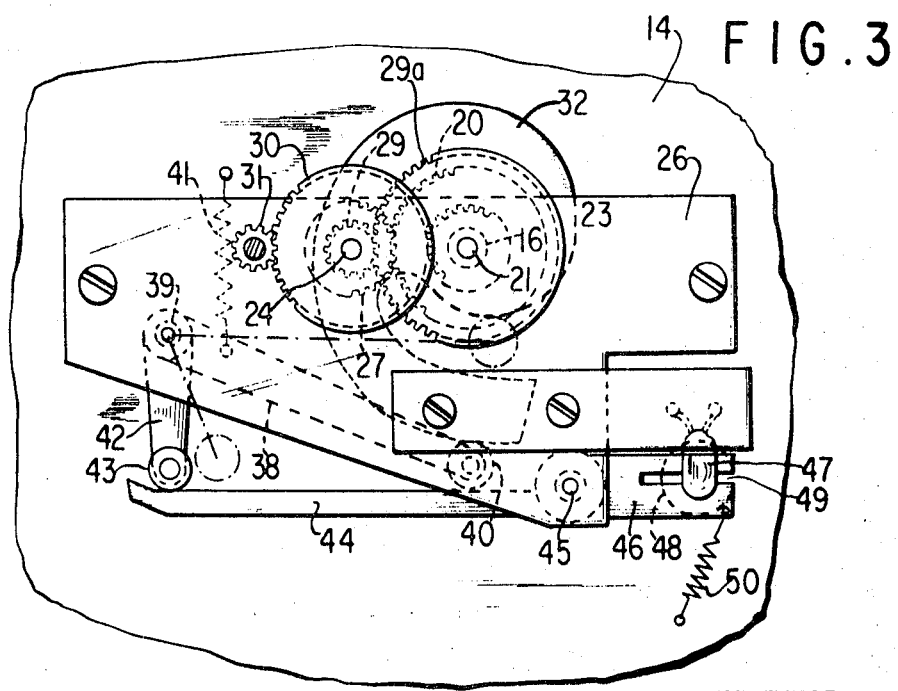
INVENTOR
THEODORE W. KENYON
BY
ATTORNEYS Sept. 23, 1969  T. W. KENYON  3,468,163

SPEEDOMETER FOR BOATS AND OTHER VEHICLES

Filed March 29, 1968  3 Sheets-Sheet 2

INVENTOR
THEODORE W. KENYON
BY
ATTORNEYS

Sept. 23, 1969         T. W. KENYON                3,468,163
SPEEDOMETER FOR BOATS AND OTHER VEHICLES
Filed March 29, 1968                              3 Sheets-Sheet 3

INVENTOR
THEODORE W. KENYON
BY
ATTORNEYS

United States Patent Office 3,468,163
Patented Sept. 23, 1969

3,468,163
SPEEDOMETER FOR BOATS AND OTHER VEHICLES
Theodore W. Kenyon, Old Lyme, Conn., assignor to The Eastern Company, Naugatuck, Conn., a corporation of Connecticut
Filed Mar. 29, 1968, Ser. No. 717,121
Int. Cl. G01c 21/10
U.S. Cl. 73—186                    10 Claims

ABSTRACT OF THE DISCLOSURE

A speedometer for boats and other vehicles involving two pointers not necessarily concentric, one showing speed in knots and the second auxiliary pointer with multiple points rotating at higher gear ratio to indicate small differences in speed with a large enough motion to be visible by an observer from a distance of many feet from the instrument, the system being virtually independent of voltage supply operations and including an electrical circuit embodying a transducer whose output which is proportional to the square of the speed of the vessel is corrected by a mechanical system to give equidivisional indication to an observer, i.e. the same indicator motion for a change from 1 to 2 knots or from 11 to 12 knots or any change in knot speed.

---

In my earlier patents, Nos. 3,287,968 and 1,955,502, accurate boat speedometers were described. Neither of these devices, however, provide means for detecting and readily ascertaining small speed changes. The detection of the latter is of primary importance in many sailboats even when the pilot or navigator is at a considerable distance from the instrument in order to facilitate proper sail trim adjustment.

Primary objects and features of this invention are the provision of an electrically operated speedometer of this kind which is virtually independent of voltage supply variations and temperature variations during operation and which is relatively simple in construction as well as simple and accurate to operate and which provides correct speed indication and also clearly visible small speed changes.

Further objects and features of the invention are to provide an instrument of this kind involving two indicators, one of which is a single point pointer to show speed in knots and the second is a multi-point (e.g. four point) pointer which rotates at a higher gear ratio in order to indicate small differences or changes in speed as they occur with large-enough motion to be visible at a distance of many feet from the instrument.

Other objects and features of the invention and provision of an electrical system for operation of the instrument embodying a transducer whose output is proportional to the square of the speed of the vessel which is corrected mechanically to give an equidivisional indication to the observer, i.e., the same extent of motion of the indicators from a change from 1 to 2 knots as from a change from higher speeds such as 11 to 12 knots or the like.

Additional objects and features of the invention are the provision of an instrument of this kind that is rugged in construction, easy to install, simple to operate and which provides accurate clearly visible indication of actual speed and small changes in speed as they occur during navigation of the vessel.

Other objects and features of the invention will become apparent from the following detailed description and accompanying drawings forming a part hereof, wherein:

FIGURE 1 is a front elevation of a nautical speedometer embodying the invention;

FIGURE 3 is a section taken along the plane of line 3—3 of FIGURE 2 also viewed in the direction of the arrows;

Figure 2:
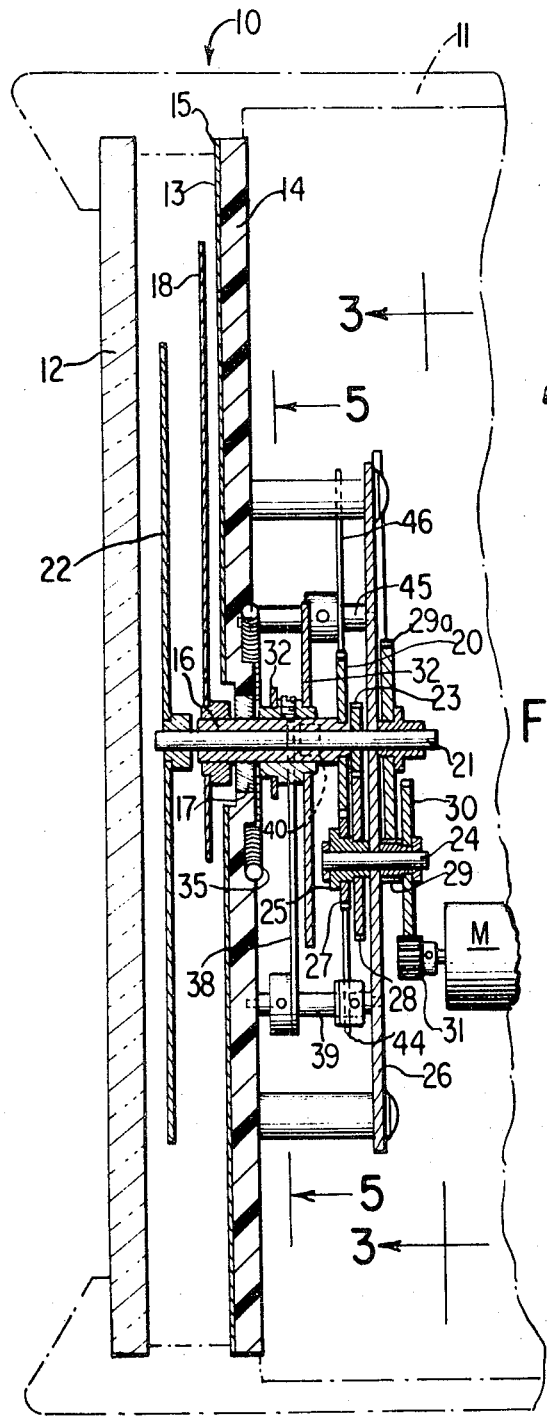
FIGURE 2 is a section taken along line 2—2 of FIGURE 1 viewed in the direction of the arrows.
Figure 4:
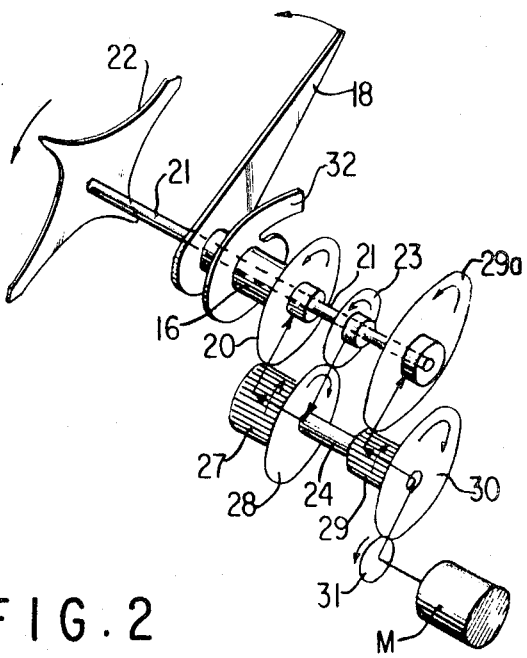
FIGURE 4 is a perspective exploded view of the mechanical gear train utilized in the instrument.
Figure 5:
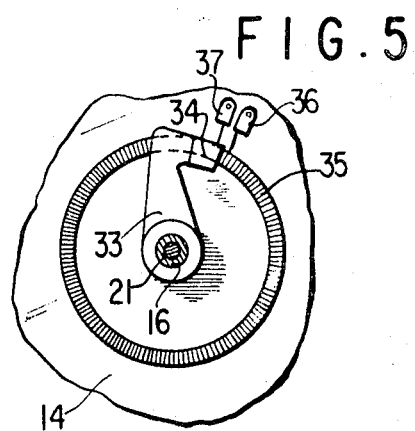
FIGURE 5 is a sectional view taken along line 5—5 of FIGURE 2 seen in the direction of the arrows.

Referring to the drawing and first to FIGURES 1-3 inclusive, the nautical speedometer 10 includes a housing 11 having an open front end covered by a transparent window 12 suitably supported in the housing and underlying which is a dial 13 graduated clockwise in knots at equi-spacing from 0–12, supported on a backing plate 14 which in turn is mounted in the housing 11, its periphery engaging a shoulder 15 in spaced relationship from the window 12. The dial 13 is shown as provided with a single set of graduations. However, a second set may be provided to facilitate reading, if desired.

A tubular shaft 16 is rotatably journaled in a bearing 17 carried by the backing plate 14 and extends forwardly and rearwardly through plate 14 being located at the center of the circle defining the dial face markings. A knot speed pointer 18 is secured to the shaft 16 forwardly of the dial face 13 as by a set screw or the like (not shown). Rearwardly of plate 14 a gear 20 is also appropriately secured to tubular shaft 16 so that driven rotation of gear 20 to be described imparts similar rotation to the pointer 18 around the dial face 13.

A second shaft 21 free to rotate relative to hollow shaft 16 extends through the latter protruding outwardly of both ends of the shaft 16. A multiple pointed second pointer 22 is fixedly secured to the forwardly projecting portion of shaft 21 in front of the first pointer 18 between the latter and window 12. In this case, the pointer 22 has four equi-spaced points 22a, 22b, 22c and 22d.

A gear wheel 23 is fixed to second shaft 21. A stud shaft 24 is mounted on a rotatable bearing 25 carried by a supporting plate 26. This bearing 25 has respectively secured for rotation therewith the gear wheels 27 and 28 which mesh respectively with the gears 20 and 23. Gear wheel 27 is of selected smaller diameter than its meshing gear wheel 20 and gear wheel 28 is of selected larger diameter than its meshing gear wheel 23.

A second gear wheel 29 is rotatively mounted on stud shaft 24 and a third gear wheel 30 of larger diameter than gear wheel 29 and secured to gear wheel 29 is likewise rotatively mounted on stud shaft 24. The gear wheel 30 meshes with a drive gear wheel 31 being of larger diameter than the latter. Gear wheel 31 is secured to the drive shaft of a reversible motor M which is powered as will be described.

The smaller diametered gear wheel 29 meshes with a larger diametered gear wheel 29a secured to the second pointer shaft 21.

The ratios of the respective gear wheels as described is such that a single rotation of gear wheel 30 will effect ½ knot rotation of main pointer 18 while second multiple point pointer 22 is simultaneously rotated an amount of 2 knots. In other words, the extent of rotation of the two pointers 18 and 22 is in the ratio of 1 to 4, or other selected ratios.

A novelly shaped equi-rise per degree of rotation cam 32 is secured on the slow rotation shaft 16 for rotation with it, for purposes presently to be described. Similarly, a rheostat arm 33 is secured on shaft 16 for rotation with it. The contact slide 34 of this rheostat arm is spring biased into engagement with an electrical resistance coil 35 which is mounted in a groove in the rear face of dial carrying plate 14 concentrically disposed about the axis of shaft 16. The cam 32 and rheostat arm 33 thus rotate simultaneously with rotation of shaft 16 for purposes to be described. The opposite ends of resistance coil 35 are secured respectively to separate spaced-apart terminals 36 and 37, both mounted on the insulative plate 14.

A first crank lever 38 is fixedly supported on a rotatable stud shaft 39 which latter is suitably supported for rotation between the plates 14 and 26. A cam follower roller 40 is mounted at the free end of crank lever 38 and is biased into engagement with the peripheral surface of cam 32 as by a biasing spring 41. A second crank lever 42 is fixedly secured to stud shaft 39 and carries a cam roller 43 at its free end which engages a lever 44 near one end thereof. The lever 44 in turn is secured to a pivot pin 45 also supported rotatably between the plates 14 and 26. The lever 44 at its other end is extended into a fork-like shutter member 46 which extends between a miniature indicator light 47 and a conventional dual photo-resistor 48. The position of the slot 49 between the tines of shutter member 46 controls the amount and direction of light transmitted by light 47 to said photo-resistor 48 for purposes to be described. The lever 44 is biased into contact with cam roller 43 as by a biasing spring 50. Thus, controlled motion of the fork slot 49 is effected by rotation of cam 32 through the agency of the system just described.

A speed sensing strut S appropriately mounted to the hull of the vehicle whose speed is to be measured in accord with the arrangement shown in my earlier Patent No. 3,287,968 is provided. This strut S is subject to torsion effected by its movement through water or other medium and is coupled via a torsion rod R or other means to a movable shutter 51 positioned to overlie a second independent dual photo-resistor 52 so that its opening 53 may be moved relative to the photo-resistor in response to twist of the torsion rod and thereby change the position of light transmitted to the photo-resistor by a second miniature indicator light 54. The operation of strut S is similar to that in my said earlier patents as it is mounted as to extend outwardly from the hull of the boat or other vehicle and reacts to flow of water past it to effect movement of said shutter 51 and thus act as a speed sensing transducer consonant with speed of the boat. Thus, whenever the boat or vehicle is in motion through the water or other medium, the torsion induced upon the strut effects substantially square law shift of the shutter opening 53 relative to the photo-resistor 52 and correspondingly changes light direction and position of the light transmitted to the photo-resistor causing development of an electrical change in electrical voltage signal, both as to amount and direction at the midpoint of the photo-resistor. This signal is transmitted via a resistor 55 to a differential high gain amplifier 56 that is normally balanced to zero output at balance and when unbalanced to provide an output voltage in appropriate direction which in turn is connected to the reversible driving motor M which as a result is driven in proper direction to effect movement of the two pointers via the gear train as will be described.

OPERATION

Figure 6:
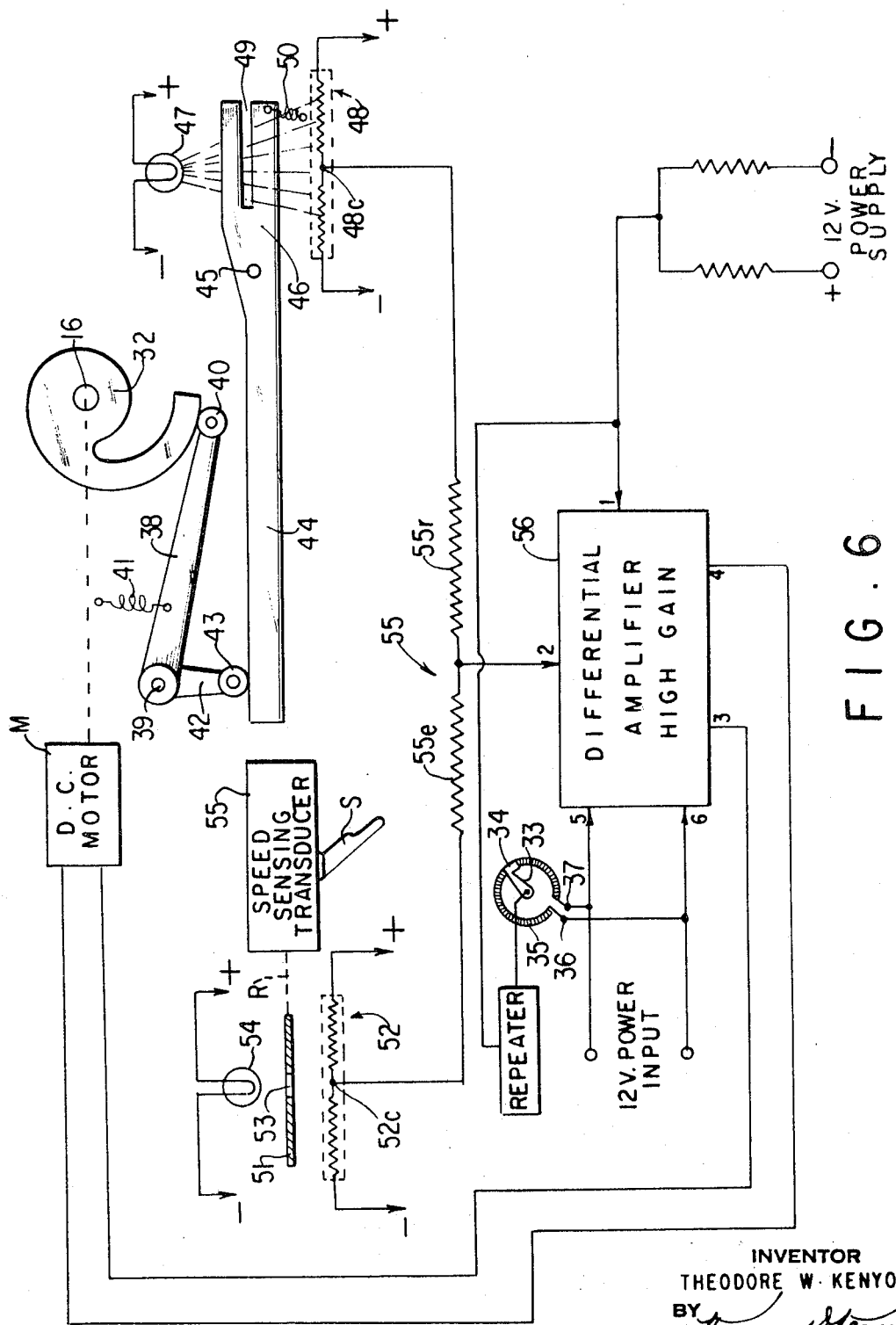
FIGURE 6 is a diagram of the electrical circuit involved in the instrument.

As seen in FIGURE 6, any changes in voltage in the respective inputs to the photo-resistors 52 and 48 change together in like amounts because both are fed from the same power source, namely, the ship's power supply. Likewise, changes in light brightness of both lights 54 and 47 are equal. Hence, the photo-resistors 52 and 48 change resistance equally if the respective shutters 53 and 46 are not moved from centralized positions. As a result, the system connected thereto stays in balance and the motor M is not energized.

A change in speed of the ship or vessel causes shutter 51 and its opening 53 to move relative to their initial positions. This causes a change in the voltage delivered from the central terminal 52c of the dual photo-resistor 52 via the left half 55e of resistor 55, thus increasing the input voltage at 2 on the differential normally balanced amplifier 56. This upsets the balance in said amplifier and a power output therefrom at its terminals 3 and 4 occurs in such a direction as to drive the described gear train via its gear 31 in such a direction as to swing the shutter 46 and its opening 49 to move the latter to a new position relative to its dual transistor 48 in such a direction as to reduce the output voltage at its central terminal 48c via the right half 55r of resistor 55 until the voltage at 2 of the amplifier 56 is brought again to neutral (nomially 6 v. for a 12 v. power supply). This sequence is reversible depending on initial direction of shift of the shutter opening 54 relative to its dual resistor 52 as controlled by the torsion provided by the strut. Thus, the motor M will always run until the input voltage at 2 to differential amplifier 56 is balanced to neutral. At such time, it stops and the indicator points 18 and 22 then remain stationary.

The linkage including equal rise cam 32, follower 40, lever 38, lever 42, roller 43, lever 44 and shutter 46 comprises a square law drive mechanism for the shutter 46. At low speeds, a small signal is produced at dual resistor 53 in consequence of small operating signals controlled by the hull-supported strut S. At high speeds, a larger change in signal or voltage at 52c is produced for the same change of speed.

It can readily be seen that for a small change in signal the equi-rise or drop cam 32 will have to rotate a considerable angular distance in order to move shutter opening 49 sufficiently relative to dual photo-resistor 48 to balance the signal introduced to the high gain differential amplifier at 2, but at higher speed due to the square law linkage, the motion of cam 32 will be much less to produce the same balancing signal change at 2. By selecting proper lever arm ratios and fixing the starting position of cam roller 43 at 90° to arm 44, the result will be an almost perfect square law function.

The rotation of motor M caused by any unbalance will cause the slow moving pointer 18 to change to its new position slowly. The higher speed rotating second multipoint pointer 22 because of its rotation with the higher speed rotating shaft 21 caused by the various gear wheel ratios will rotate faster even for small changes in speed and such movement will be readily observable to the navigator even at a distance of several feet from the dial even when the movements of the more slowly rotating pointer 18 are not.

Thus actual speed in knots of the vessel is readily visible at all times via pointer 18 and the dial markings on dial 13 and even very small changes in speed are readily visible via the faster rotating multipoint pointer 22. The different marking on its points 22b, 22c and 22d serve to move four-fold over the dial in the case of the described structure or multifold if fewer numbers of points are utilized, accordingly.

Since the photo-resistor components are balanced relative to their center points, temperature variation is practically balanced out. The electrical system described can be termed a nulling system which is unaffected practically by changes of voltage supply over the conventional operational range.

The rheostat 35 serves for connection of the system to a repeater circuit for duplication in a second instrument and in distance measuring equipment.

While specific embodiments of the invention have been described and shown, variations in structural detail within the scope of the appended claims are possible and are contemplated. There is no intention, therefore, of limitation to the exact abstract or disclosure herein presented.

What is claimed is:

1. A speed indicator comprising a pair of reversible pointers, driving means, gear train means operated by said driving means for simultaneously moving both said pointers with reference to a dial at different relative speeds, the faster moving of said pointers having a plurality of equi-spaced points providing readily visible indication of relative small changes in speed with large motion, speed sensing means, and a source of electric power, a nulling system supplied from said source and substantially unaffected by changes of supply voltage in its operative range for effecting rotation in corresponding direction of said driving means whenever said nulling system becomes unbalanced as the result of speed changes, and means for providing equi-divisional indication by the pointers on said dial of speed and speed changes detected by said speed sensing means.

2. A speed indicator according to claim 1, wherein said nulling system includes a pair of photo-resistors, separate light sources for directing light to respective of said photo-resistors, independently operable shutter means for controlling the direction of light transmitted to respective of said photo-resistors, an electrical circuit interconnecting said two photo-resistors including a differential high gain amplifier, means connecting said circuit to an input to said amplifier to unbalance the same and render it operative to provide an output to said driving means to rotate said driving means, and cam means coupled to the slower moving of said pointers for operating the second of said shutter means to move the latter relative to said second photo-resistor to return the input to said amplifier to a non-operative voltage and halt rotational operation of said driving means when said pointers have been moved thereby to correct speed indication on said dial.

3. A speed indicator according to claim 2 including means for energizing all electrical components from said common electric power source.

4. A speed indicator according to claim 1, wherein said nulling system includes equal rise per degree of rotation cam means coupled to the slower of said pointers and linkage means operated by said cam means as a result of movement of said cam means occurring during movement of said slower of said pointers to rebalance the unbalanced nulling system when said slower pointer means has been moved by said driving means to correct speed indicating position over said dial.

5. A speed indicator according to claim 1, including square law drive means in said nulling system for providing uniform equidivisional indication to the observer by said pointers with reference to said dial.

6. A speed indicator according to claim 1, wherein said equi-spaced points are differently marked.

7. A speed indicator according to claim 1, wherein there are four of said equi-spaced points.

8. A speed indicator according to claim 1, wherein said speed sensing means provides an output proportional to the square of the speed being measured and said nulling system includes cam and lever controlled means operative simultaneously on movement of the slower of said pointers to provide a restoration of balance to said nulling system according to a square law function so that equi-divisional speed indication on the dial by the pointers results.

9. A speed indicator according to claim 8 wherein said speed sensing means includes a hull supported strut movable therewith through water and subjected to torsion thereby, a transducer operatively responsive to changes in speed to provide a speed sensing electrical output proportional to the square of the speed, means for introducing said output to said nulling system to unbalance the latter and effect movement of said pointers over said dial, and square law function means operated on movement of the slower of said pointer means to rebalance said nulling system and halt the latter point at the proper dial indication of measured speed, any speed changes thereafter again unbalancing said nulling system and effecting renewed slow motion of the first pointer and faster motion of the second pointer.

10. A speed indicator according to claim 9, wherein said second pointer has multiple equi-spaced points each separately marked.

References Cited

UNITED STATES PATENTS 2,756,593   7/1956   Russell et al. _____ 73—186

DONALD O. WOODIEL, Primary Examiner

U.S. Cl. X.R.

116—129